(12) United States Patent
Bertrand et al.

(10) Patent No.: US 8,772,639 B2
(45) Date of Patent: Jul. 8, 2014

(54) MAINTENANCE OF ELECTRIC CABLES BY SELF-REPAIRING

(75) Inventors: Yves Bertrand, Veneux-les-Sablons (FR); Céline Martin, Rives (FR); Gérard Mortha, Laissaud (FR)

(73) Assignee: Electricite de France, Paris (FR)

( * ) Notice: Subject to any disclaimer, the term of this patent is extended or adjusted under 35 U.S.C. 154(b) by 155 days.

(21) Appl. No.: 13/381,414

(22) PCT Filed: Jun. 29, 2010

(86) PCT No.: PCT/FR2010/051359
§ 371 (c)(1),
(2), (4) Date: Dec. 29, 2011

(87) PCT Pub. No.: WO2011/001104
PCT Pub. Date: Jan. 6, 2011

(65) Prior Publication Data
US 2012/0103654 A1    May 3, 2012

(30) Foreign Application Priority Data

Jun. 30, 2009 (FR) .................................... 09 54463

(51) Int. Cl.
*H01B 3/30* (2006.01)
*H01B 3/44* (2006.01)
*H01B 7/295* (2006.01)

(52) U.S. Cl.
USPC ..................................... 174/110 R; 427/118

(58) Field of Classification Search
USPC ........................................................ 427/118
See application file for complete search history.

(56) References Cited

U.S. PATENT DOCUMENTS

| 2,029,546 | A | 2/1936 | Schatzel | |
| 3,819,037 | A | 6/1974 | Filreis | |
| 4,833,275 | A * | 5/1989 | Fosse et al. | 174/21 R |
| 6,399,878 | B2 * | 6/2002 | Kondo et al. | 174/25 R |
| 7,285,306 | B1 | 10/2007 | Parrish | |

FOREIGN PATENT DOCUMENTS

| CA | 2 396 949 A1 | 7/2001 |
| EP | 0 556 522 A1 | 8/1993 |
| FR | 2 197 785 A1 | 3/1974 |
| WO | WO 99/33071 A1 | 7/1999 |

OTHER PUBLICATIONS

Office Action issued for CA 2,766,904 (Jan. 28, 2014).

* cited by examiner

*Primary Examiner* — Jayprakash N Gandhi
*Assistant Examiner* — Dion Ferguson
(74) *Attorney, Agent, or Firm* — Drinker Biddle & Reath LLP

(57) ABSTRACT

A method is provided for maintaining an electric cable, said electric cable comprising at least one electric conductor surrounded by an outer sheath, said outer sheath containing an insulating oil distributed around said electric conductor, such as a fluid-oil cable or an oil-filled cable. A drying oil, selected so as to solidify upon contacting the air, is added to the oil of the cable for sealing off any accidental oil leak through an outer sheath of the electric cable.

14 Claims, 2 Drawing Sheets

MAINTENANCE OF ELECTRIC CABLES BY SELF-REPAIRING

CROSS-REFERENCE TO RELATED APPLICATIONS

This application is the U.S. national phase of the International Patent Application No. PCT/FR2010/051359 filed Jun. 29, 2010, which claims the benefit of French Application No. 09 54463 filed Jun. 30, 2009, the entire content of which is incorporated herein by reference.

FIELD OF THE INVENTION

The present invention relates to the maintenance of an electric cable comprising at least one electric conductor surrounded by an outer sheath containing an insulating oil distributed around the electric conductor, such as a fluid-oil cable or an oil-filled cable.

BACKGROUND

In such cables, the oil is introduced into the cable during the process of manufacturing the electric cable or can be injected into the cable after manufacture, from one or more oil tanks. For some applications, the cable can be buried and at least one oil tank, connected to the underground cable, can be arranged at least one end of the cable, for example in an oil pressurization station.

Nevertheless, accidental oil leaks can occur through the outer sheath of the cable. These leaks can be due to ageing of the sheath, for example. It is then possible to detect a reduction in the oil level in one of the oil tanks, and it is then necessary to find the site of the leak and seal it off. Locating and repairing leaks are demanding operations that are complex to implement and ultimately always require significant earthworks which are generally carried out in an urban area.

A specific chemical agent can be injected into the oil, which diffuses into the cable oil and is released from the cable at the leak. The position of the leak can then be identified with a precision of a few meters only along the cable by detecting the emanations of the chemical agent through the soil. However, this method of locating a leak by chemical tracer has several drawbacks, namely:

It also requires the excavation of a portion of trench over a few meters in order to repair the leak.
It requires the use of a mass spectrometer type gas detector, which is expensive, bulky and complicated to use.
The gas released via the leak can be harmful to the environment.

SUMMARY

The present invention aims to improve the situation.

To this end, the present invention proposes a method of maintenance of an electric cable that comprises at least one electric conductor surrounded by an outer sheath containing an insulating oil distributed around the electric conductor. According to the present invention, the method consists of adding to the insulating cable oil a drying oil selected for solidifying upon contacting the air, in a proportion chosen to seal off a possible oil leak that may occur accidentally through the outer sheath.

When a diffuse oil leak occurs at the outer sheath of the cable, for example through a porosity due to the ageing of the sheath, the drying oil contained in the cable oil comes into contact with air. The drying oil then polymerizes and causes the mixture of oils to solidify, producing the sealing off of the leak opening. The oil flow out of the cable is thus stopped, avoiding pollution of the environment of the cable. The outer sheath of the cable is then once again leaktight, due to a film of solidified oil.

Moreover, the method of maintenance of an electric cable according to the invention makes it possible to repair damage to the outer sheath of the cable as soon as it occurs, without the need for an operator to intervene directly on the sheath itself. In particular, no trench giving access to the cable is required.

Thus, advantageously, a leak of oil or another substance harmful to the environment is avoided in a timely fashion.

Another advantage attained by the invention is that it is not necessary to excavate a trench in order to repair an external oil leak.

Another advantage of the method within the meaning of the invention is that it is compatible both with fluid-oil electric cables and oil-filled cables. Moreover, the cables can already have been installed before the present invention.

Yet another advantage of the invention is that the method for maintaining an electric cable is thus very inexpensive and simple to implement as it does not require the use of expensive, bulky equipment that is complicated to use, such as a mass spectrometer.

Finally, the method according to the invention is also effective for eliminating an oil leak through the accidental opening of the outer sheath of the cable.

According to a first improvement of the invention, the drying oil polymerizes upon contacting dioxygen, typically ambient air for example. Thus, when an oil leak occurs through the outer sheath, the drying oil comes into contact with the dioxygen present outside the cable and polymerizes. The sealing off of the leak is obtained by obstruction of the leak opening.

According to a second improvement of the invention, when the electric cable is connected to at least one oil tank, the drying oil can be added to the insulating cable oil via one or more of these oil tanks. The maintenance method can therefore be implemented easily in this way, in particular for fluid-oil cables and for oil-filled cables that were already installed before implementation of the present invention. In particular, this can be a buried electric cable with oil tanks directly accessible at the pressurization stations located at least one end of the cable and optionally along the cable, without the need for digging up. A maintenance method according to the invention therefore makes it possible to seal off a leak without the need to excavate a trench to free the portion of electric cable containing a leak.

According to a third improvement of the invention, the insulating cable oil can be kept under pressure in the outer sheath without modifying the means implemented at the pressurization stations. Pressurizing the cable oil makes it possible to avoid bubbles forming which can cause electric arcing capable of damaging the electric insulation of the cable.

The present invention also proposes a self-repairing electric cable device, comprising:
at least one electric conductor,
an outer sheath arranged around the electric conductor, and containing an insulating oil distributed around the electric conductor.

In such a cable device according to the invention, the composition of the insulating cable oil comprises at least one drying oil. The proportion of the drying oil in the composition of the cable oil is chosen for sealing off a possible oil leak through the outer sheath.

In different embodiments of the present invention, the drying oil can be a vegetable oil such as a linseed oil or a China wood oil, also called "tung oil", or a mixture of linseed and tung oil.

According to an improvement of the device of the present invention, the final composition of the cable oil can comprise moreover a polymerization catalyst. The addition of such a polymerization catalyst promotes and/or accelerates the polymerization of the drying oil. The leak is then sealed off more quickly. In particular, the composition of the polymerization catalyst can comprise a cobalt salt. The cobalt salt promotes the reaction of the drying oil with dioxygen, efficiently initiating the polymerization reaction of the drying oil and thus allowing an oil leak through the outer sheath to be sealed off more quickly.

According to a further feature of the invention, the electric cable can be adapted in order to withstand a cable oil pressure comprised between 1 and 20 bar. The cable can then contain the cable oil under sufficient pressure to reduce the risk of bubbles forming despite the presence of drying oil in the cable oil.

BRIEF DESCRIPTION OF THE DRAWINGS

Other features and advantages of the invention will become apparent on examining the detailed description below, and the attached drawings in which.

DETAILED DESCRIPTION

Figure 1:
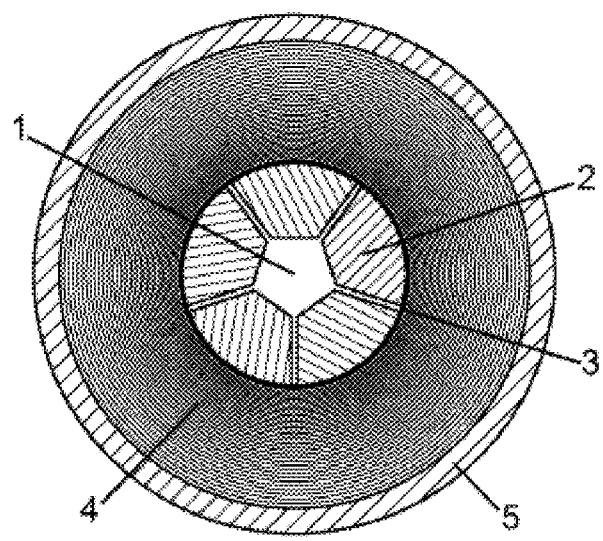
FIG. 1 is a cross-section of a (single-phase) fluid-oil electric cable to which the invention can be applied.

In the embodiment shown in FIG. 1, an electric conductor 2 of the electric cable has the form of a hollow core segmented into several sectors immersed in insulating oil.

In the centre of the cable, an oil channel 1 is delimited by inner faces of the sectors. This channel allows the cable to be supplied with an insulating liquid, such as an oil. According to the invention, the liquid contains at least one hydrocarbon-based oil, such as a mineral oil, and a drying oil, for example a vegetable oil, added to the mineral oil, and optionally a polymerization catalyst.

The drying oil can be added to the cable oil already present in the channel 1 when the cable was installed before the present invention.

For fluid-oil cables, the cable oil to which the drying oil is added is static or made to move in the oil channel 1, and subjected to a low pressure, less than 5 bar, preferably comprised between 1 and 2 bar.

Optionally, the electric conductor 2 can be surrounded by a layer shielding the core 3.

The electric conductor 2, with optional shielding of the core 3, is surrounded by strips of a porous electrically insulating material 4 wound in successive layers. This insulating material, which can be paper for example, is impregnated with a mixture of cable oil and drying oil. This mixture of oils, which is present in the oil channel 1, can flow as far as the insulating material 4, passing between the sectors of the electric conductor 2 and through the optional shielding of the core 3.

The insulating material 4 thus impregnated with the mixture of oils is itself surrounded by an outer sheath 5, one of the functions of which is to keep the mixture of oils inside the electric cable.

Figure 2:
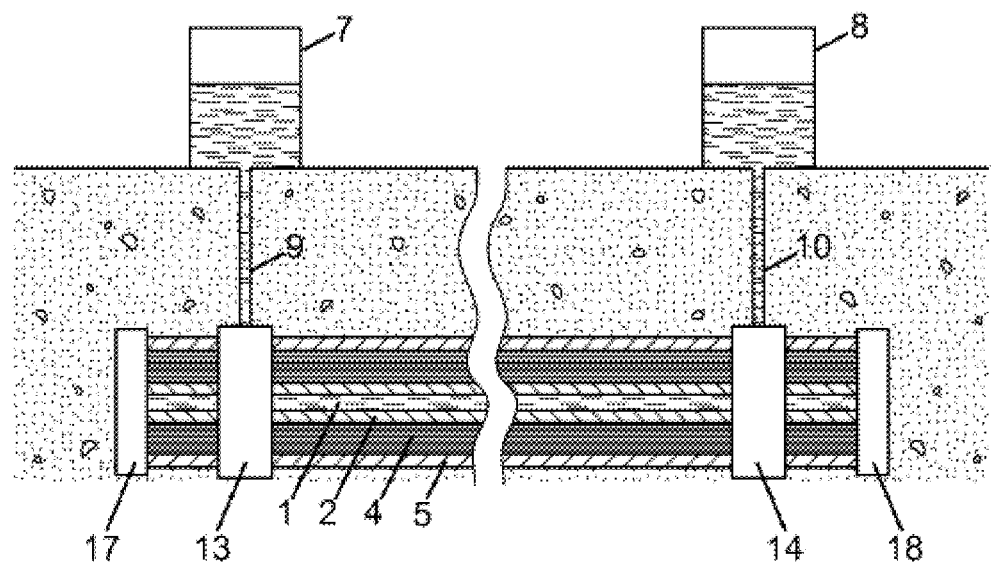
FIG. 2 shows diagrammatically a particular implementation of a channel link of a cable according to FIG. 1.

With reference to FIG. 2, an electric cable as described previously is buried in the ground. Oil tanks 7 and 8 are arranged at the ends of the cable, for example in oil pressurization stations. An intermediate oil tank can optionally be arranged along the cable, for example in an intermediate pressurization station.

These tanks make it possible to keep the oil pressure in the cable constant. When the temperature of the cable increases, the cable oil expands and the volume of oil in the channel link increases. Inversely, when the temperature of the cable reduces, the volume of oil in the channel link reduces. Thus, the oil tanks of the pressurization stations behave like expansion chambers for the cable oil and make it possible to compensate for a variation in the volume of the cable oil that is linked to a variation in the temperature of the cable, while keeping the pressure of the oil in the cable constant.

To this end the tanks 7 and 8, which are located close to the ends of the cable, are linked to a hydraulic circuit of the cable by means of respective intermediate hydraulic circuits 9 and 10 and respective connection accessories 13 and 14. Each of the connection accessories 13 and 14 makes it possible to separate the hydraulic oil circuit of the cable from the electric circuit of the cable and to ensure the continuity of the hydraulic oil circuit of the cable. Cable terminal modules 17 and 18, commonly called "cable ends" provide continuity of the electric circuit of the cable, and isolate the hydraulic oil circuit of the cable. The continuity of the hydraulic oil circuit of the cable is provided by the connection accessories 13 and 14, which are linked to the tanks 7 and 8 via the intermediate hydraulic circuits 9 and 10 respectively.

The tanks 7 and 8 are located in installations, such as the pressurization stations, allowing an operator easy access to said tanks. The configuration of the channel link of a cable that is shown in FIG. 2, is in accordance with the known fluid-oil cable installations.

When the drying oil is introduced into the oil tanks 7 and 8, it diffuses in the oil already present in the cable by means of the respective intermediate hydraulic circuits 9 and 10 and the respective connection accessories 13 and 14.

The cable can have a leak, for example as a result of ageing of its outer sheath 5. The mixture of oils then leaks through the outer sheath 5 towards the outside of the cable, causing environmental pollution. Moreover, such an oil leak can cause a pressure drop and lead to bubbles forming inside the cable, in particular in the insulating material 4 of a fluid-oil cable. Electric arcing can then occur, causing irreversible damage to the cable.

Two possible implementations can then be envisaged in order to avoid such damage: adding drying oil as a preventive measure or adding drying oil in the event that a leak is detected.

Thus, according to a first implementation of the present invention, the drying oil can initially be added to the cable oil in the absence of a leak. Adding the drying oil to the cable oil then produces sealing of the leak as soon as it occurs. The drying oil polymerizes upon contacting dioxygen, typically ambient air present outside the cable at the site of the leak. Particularly timely sealing off then takes place.

According to another implementation of the invention, the drying oil is added to the cable oil in the oil tanks 7, 8, when the leak is detected. If an oil leak occurs, it is detected by noting a drop in the oil level in at least one of the tanks 7 and 8. The leak is then sealed off by polymerization of the drying oil without additional intervention by an operator, other than adding drying oil into the tank. The diffusion of the drying oil in the cable oil where the leak has occurred can be quick when the cable oil is made to move in the oil channel 1. For a fluid-oil cable called a "circulating oil cable", the cable oil is made to circulate permanently in the oil channel 1. For other types of fluid-oil cable, the cable oil can be made to move in an oscillating back-and-forth movement in the oil channel 1 by alternately increasing the oil pressure in a pressurization station at one end of the cable and reducing it in the pressurization station at the other end of the cable. As a result of the oil in the cable being made to move in this way, the speed of diffusion of the drying oil in the cable oil is increased and the sealing off of the leak by polymerization of the drying oil is quicker.

The invention is applicable to any cable including at least one electric conductor and an outer sheath arranged around the electric conductor and containing an oil distributed around the electric conductor. In a known manner, fluid-oil cables and oil-filled cables have such a structure.

It is noted that the electric insulation of an electric conductor of a fluid-oil cable is obtained by a winding of successive layers of a porous electric insulating material impregnated with an oil, for example by a paper winding. An outer sheath surrounds the insulating material and contains the oil inside the cable.

An oil-filled cable comprises several assembled phases, generally three, each containing an electric conductor surrounded by an insulation sheath. An outer sheath surrounds the phases and contains an oil distributed around the phases inside the cable.

Figure 3:
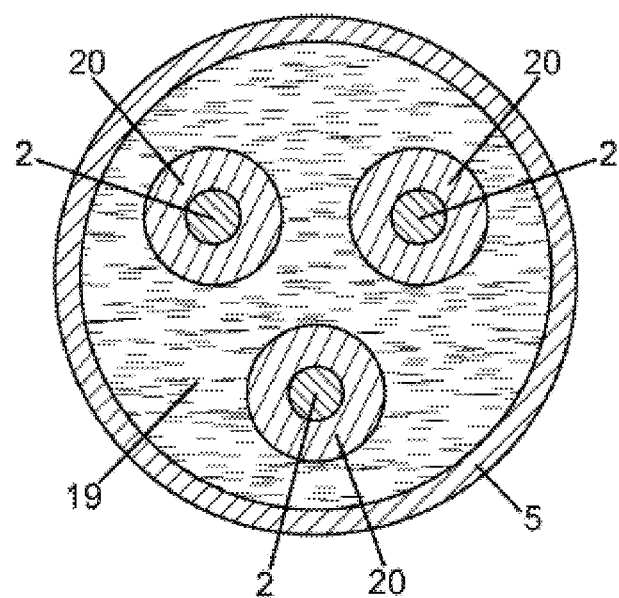
FIG. 3 is a cross-section of a (three-phase) oil-filled electric cable to which the invention can be applied.

According to an embodiment of an oil-filled cable shown in cross-section in FIG. 3, the outer sheath 5 contains the insulating cable oil 19, which is distributed around three phases. Each of the phases comprises an electric conductor 2 and an insulation sheath 20 surrounding the electric conductor 2.

Generally, the insulation sheath 20 comprises a porous electrically insulating material wound in successive layers and impregnated with a viscous oil.

When an oil leak occurs through the outer sheath 5, a pressure drop can occur locally and bubbles can form inside the cable, in particular in the insulation sheath 20 of at least one of the phases of the oil-filled cable. Electric arcing can then occur, causing irreversible damage to the cable. In order to avoid bubbles forming, the insulating cable oil 19 is subjected to a high pressure that can be comprised between 10 and 20 bar for example, preferably between 12 and 18 bar.

The known configuration of a channel link of an oil-filled cable is very similar to that shown in FIG. 2. The oil-filled cable is buried in the ground and at least one oil tank 7, 8 is arranged at least one end of the cable, for example in an oil pressurization station. The oil tank 7, 8 is linked with the hydraulic circuit of the cable via an intermediate hydraulic circuit 9, 10 and the respective connection accessory 13, 14.

For both types of cables, oil-filled and fluid-oil, adding drying oil, which generally has a high viscosity, to the cable oil, gives the mixture of oils a higher viscosity than that of the initial cable oil. Thus, if a leak occurs through the outer sheath 5 of the cable, the flow of the oil leak is reduced by adding drying oil, owing to the increased viscosity of the mixture of oils, even before the complete sealing off of the leak attained by the polymerization of the drying oil. Pollution of the soil around the cable is therefore already reduced as a result of the increased viscosity that the drying oil gives the cable oil.

A drying oil, for example linseed oil or China wood oil, also called tung oil, is added to the cable oil in a proportion chosen for sealing off the leak. The proportion of drying oil added is moreover chosen to preserve the high electric insulation attained by the porous insulating material impregnated with the mixture of oils. Moreover, such a mixture can have hydraulic properties, in particular viscosity, that are different from those of the initial cable oil. The proportion of drying oil is then moreover chosen preferably in order to alter the hydraulic behaviour of the cable only slightly or not at all. The hydraulic behaviour can in particular be characterized by a rheological profile of the mixture of oils, and by the radial diffusion (or "diffusibility" in the case in question) of the mixture of oils through the materials present from the oil channel 1 to the inner face of the outer sheath 5.

There is then a compromise for the choice of the proportion of drying oil added to the cable oil:
the proportion of drying oil must be sufficiently low to preserve as far as possible the electric and hydraulic behaviour of the cable. Thus, the proportion of drying oil in the cable oil composition is preferably less than 50% (percent) by weight, more preferably less than 30% by weight;
the proportion of drying oil is preferably sufficiently high to seal off an oil leak through the outer sheath 5 of the cable rapidly and efficiently. Thus, the proportion of drying oil in the mixture of oils is preferably greater than 5% by weight, even more preferably greater than 10% by weight.

Thus, the proportion of drying oil in the composition of the insulating cable oil can be comprised between 5% and 50%, preferably between 10% and 30%.

In order to optimize this compromise, the insulating cable oil within the meaning of the invention can comprise a polymerization catalyst that contains a mineral salt, for example a cobalt salt. Such a catalyst promotes and/or accelerates the polymerization of the drying oil upon contacting dioxygen. Thus, when a leak occurs through the outer sheath 5, the drying oil polymerizes more rapidly and produces quicker and more efficient sealing off, for a proportion of drying oil in the mixture that can be low. Owing to the presence of a small quantity of dioxygen inside the cable, the proportion of polymerization catalyst in the mixture of oils can be less than 10% by weight, preferably less than 5% by weight, in order to avoid polymerization of the drying oil inside the cable in the absence of a leak.

The proportions in the mixture of oils, i.e. the proportions in the composition of the cable oil resulting from the use of the invention, can be adjusted, in particular according to the desired speed of sealing off.

According to a preferred embodiment of the invention, producing the mixture of the cable oil and the drying oil can include the following steps:
dissolving the mineral salt that constitutes the polymerization catalyst in the drying oil at a temperature above 40° C., preferably above 50° C., then
mixing the drying oil, which comprises the dissolved mineral salt, with the initial cable oil.

In an embodiment, the composition of the mixture of oils impregnating the insulating material 4 of a fluid-oil cable can comprise:
approximately 20% by weight of tung oil,
approximately 1% by weight of cobalt salt, and
the complement (approximately 79% by weight) of standard fluid oil, for example reference oil T 3788 DUSSEK CAMPBELL®.

The mixture thus obtained is homogenous and has a satisfactory viscosity, in particular for an application in which fluid oil circulates in the cable.

Moreover, according to the tests carried out, this mixture allows the sealing off in less than twenty-four hours of a leak through the outer sheath 5 of a fluid-oil cable, in which the mixture is subject to a pressure of 1.5 bar, with an initial oil leak flow greater than 250 liters per week.

It is understood that the invention is not limited to its implementations in cables the structures of which correspond to FIGS. 1 and 3. The cable can in particular incorporate additional constituent elements. Moreover, it is specified that the conductive core of the fluid-oil cable can be produced differently to that based on separate sectors and that the shielding layer 3 of the core 2 is not essential for the invention.

The invention claimed is:

1. A method of maintenance of an electric cable, said cable comprising:
   at least one electric conductor;
   an outer sheath surrounding said electric conductor;
   an insulating oil contained in said outer sheath and distributed around said electric conductor,
   the method comprising the steps of:
      selecting a drying additive in order to solidify upon contacting the air, and
      adding a drying additive to the insulating cable oil, in a proportion chosen for sealing off any oil leak through the outer sheath.

2. The method of claim 1, wherein the drying additive polymerizes upon contacting dioxygen.

3. The method of claim 1, wherein, said electric cable being connected to at least one oil tank, the drying additive is added to the insulating cable oil in said oil tank.

4. The method of claim 3, wherein said cable is buried while said tank is placed so as to be directly accessible without digging up.

5. The method of claim 1, wherein the insulating cable oil is kept under pressure in said outer sheath.

6. A self-repairing electric cable device comprising:
   at least one electric conductor,
   an outer sheath arranged around said electric conductor, said outer sheath containing an insulating oil distributed around said electric conductor, a composition of the insulating cable oil comprising at least one drying additive, a proportion of the drying additive in the composition of the cable oil being chosen for sealing off a possible oil leak through the outer sheath.

7. The device according to claim 6, wherein a drying additive composition comprises a linseed oil.

8. The device according to claim 6, wherein a drying additive composition comprises a China wood oil.

9. The device according to claim 6, wherein the proportion of drying additive in the composition of the insulating cable oil is comprised between 5% and 50%.

10. The device according to claim 9, wherein said proportion of drying additive is comprised between 10% and 30%.

11. The device according to claim 6, wherein the composition of the insulating cable oil further comprises a polymerization catalyst, for promoting and/or accelerating polymerization of the drying additive.

12. The device according to claim 11, wherein a polymerization catalyst composition comprises a cobalt salt.

13. The device according to claim 11, wherein a proportion of said polymerization catalyst in the composition of the insulating cable oil is less than 5%.

14. The device according to claim 6, wherein the electric cable is adapted in order to withstand a pressure of the insulating cable oil comprised between 1 and 20 bar.

\* \* \* \* \*